(12) United States Patent
Karlsson et al.

(10) Patent No.: US 9,510,245 B2
(45) Date of Patent: Nov. 29, 2016

(54) CIRCUIT SWITCHED/PACKET SWITCHED (CS/PS) COORDINATION IN A SHARED NETWORK

(71) Applicant: Telefonaktiebolaget L M Ericsson (publ), Stockholm (SE)

(72) Inventors: Josefin Karlsson, Torslanda (SE); Lars-Bertil Olsson, Angered (SE); Peter Ramle, Molnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/439,487

(22) PCT Filed: Oct. 29, 2013

(86) PCT No.: PCT/EP2013/072560
§ 371 (c)(1),
(2) Date: Apr. 29, 2015

(87) PCT Pub. No.: WO2014/067921
PCT Pub. Date: May 8, 2014

(65) Prior Publication Data
US 2015/0296421 A1    Oct. 15, 2015

Related U.S. Application Data

(60) Provisional application No. 61/720,022, filed on Oct. 30, 2012.

(51) Int. Cl.
*H04W 36/00* (2009.01)
*H04W 36/08* (2009.01)
*H04W 36/12* (2009.01)
*H04W 48/18* (2009.01)
*H04B 7/185* (2006.01)

(52) U.S. Cl.
CPC ......... *H04W 36/0022* (2013.01); *H04W 36/08* (2013.01); *H04W 36/12* (2013.01); *H04W 48/18* (2013.01); *H04B 7/18541* (2013.01); *H04W 36/00* (2013.01); *H04W 36/0005* (2013.01)

(58) Field of Classification Search
None
See application file for complete search history.

(56) References Cited

U.S. PATENT DOCUMENTS

2011/0176510 A1* 7/2011 Hallenstal ......... H04W 36/0022
370/331

FOREIGN PATENT DOCUMENTS

WO     03017704 A1    2/2003
WO    2011072755 A1    6/2011

OTHER PUBLICATIONS

"3rd Generation Partnership Project; Technical Specification Group Services and System Aspects; Network Sharing; Architecture and Functional Description (Release 11)", 3GPP Standard; 3GPP TS 23.251, 3rd Generation Partnership Project (3GPP), Mobile Competence Centre; vol. SA WG2, No. VI 1.3.0, Sep. 11, 2012, pp. 1-30.*

(Continued)

*Primary Examiner* — Leon-Viet Nguyen
(74) *Attorney, Agent, or Firm* — Rothwell, Figg, Ernst & Manbeck, P.C.

(57) ABSTRACT

The embodiments herein relate to a method in a RAN node (305) for determining which operator that should serve a device (301) when it has been handed over from a source network to a target shared network (300). When the device (301) has been handed over to the target shared network (300), the RAN node (305) transmits, to a non-registered CN node (312) in a non-registered domain (300*nr*), a request for an identity of the device (301). The RAN node (305) transmits a request, to CN nodes (310) in a registered domain (300*r*), for a serving operator which has registered the device (301). The RAN node (305) receives information indicating the serving operator. The RAN node (305) determines that the same serving operator which served the identified device in the registered domain (300*r*) should also serve the device (301) in the non-registered domain (300*nr*).

29 Claims, 13 Drawing Sheets

(56) References Cited

OTHER PUBLICATIONS

"3rd Generation Partnership Project; Technical Specification Group Services and System Aspects; Network Sharing; Architecture and Functional Description (Release 11)", 3GPP Standard, 3GPP TS 23.251, 3rd Generation Partnership Project (3GPP), Mobile Competence Centre; 650, Route Des Lucioles; F-06921 Sophia-Antipolis Cedex, France, vol. SA WG2, No. V11.3.0, Sep. 11, 2012, pp. 1-30, XP050649054.

* cited by examiner

CIRCUIT SWITCHED/PACKET SWITCHED (CS/PS) COORDINATION IN A SHARED NETWORK

CROSS-REFERENCE TO RELATED APPLICATION

This application is a 35 U.S.C. §371 National Phase Entry Application from PCT/EP2013/072560, filed Oct. 29, 2013, and designating the United States, which claims priority to U.S. Provisional Application No. 61/720,022, filed Oct. 30, 2012. The above applications are incorporated by reference in their entirety.

TECHNICAL FIELD

Embodiments herein relate generally to a Radio Access Network (RAN) node, a method in the RAN node, a registered Core Network (CN) node, a method in the registered CN node, a non-registered CN node and a method in the non-registered CN node. More particularly the embodiments herein relate to CS/PS coordination in a shared network and to determining which operator that should serve a device when it has been handed over from a source network to a target shared network.

BACKGROUND

In a typical communications network, also referred to as e.g. a wireless communications network, a wireless communications system, a communications network or a communications system, a device, communicates via a RAN to one or more CNs.

The RAN implements a radio access technology such as for example UTRAN, E-UTRAN, GERAN or any other Third Generation Partnership Project (3GPP) radio access technology. UTRAN is short for Universal Terrestrial Radio Access Network and comprises radio network nodes such as a Node B and Radio Network Controller (RNC). E-UTRAN is short for Evolved-UTRAN and is the air interface of Long Term Evolution (LTE). E-UTRAN comprises a radio network node referred to as an evolved NodeB (eNB) which performs tasks similar to those performed by the nodeB and RNC together in UTRAN. GERAN is short for GSM EDGE Radio Access Network, where GSM is an abbreviation for Global System for Mobile communications and EDGE is and abbreviation for Enhanced Data rates for Global Evolution. GERAN comprises the radio network nodes Base Transceiver Stations (BTS) and Base Station Controller (BSC). The radio access network node will be referred to as RAN node in some of the drawings.

The CN may be divided in circuit switched and packet switched domains. An example of a circuit switched CN node is Mobile services Switching Centre (MSC). An example of packet switched CN node is a Serving GPRS Support Node (SGSN). GPRS is short for General Packet Radio Service. The core network node will be referred to as CN node in some of the drawings.

The communications network is a geographical area which is divided into cell areas. The communication network may therefore also be referred to as a cellular network. Each cell area is served by a base station, e.g. a Radio Base Station (RBS), which sometimes may be referred to as e.g. eNB, eNodeB, NodeB, B node, or BTS, depending on the technology and terminology used. The base stations communicate with the devices within range of the base stations.

The device may be a device by which a subscriber may access services offered by an operator's network and services outside operator's network to which the operators radio access network and core network provide access, e.g. access to the Internet. The device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The device may be portable, pocket storable, hand held, computer comprised, or vehicle mounted devices, enabled to communicate voice and/or data, via the radio access network, with another entity, such as another device or a server. The device is enabled to communicate wirelessly in the communications network. The communication may be performed e.g. between two devices, between a devices and a regular telephone and/or between the devices and a server via the radio access network and possibly one or more core networks and possibly the internet.

There are two operational modes of the device: idle mode and connected mode. In idle mode, after the device has been switched on, it selects a Public Land Mobile Network (PLMN) to connect to. The device searches for a cell of the selected PLMN that can provide available services and camps on the selected cell. In idle mode, the device is identified by parameters such as International Mobile Subscriber Identity (IMSI), Temporary Mobile Subscriber Identity (TMSI) and Packet Temporary Mobile Subscriber Identity (P-TMSI). The RAN does not have any information about idle devices, i.e. information such as location, bearer information etc. The device stays in idle mode until it transmits a request to establish a radio connection. In connected mode, the device transmits and receives data. The device leaves the connected mode and returns to idle mode when the RRC connection is released or at RRC connection failure. In connected mode, the RAN has information about the connected devices, i.e. information such as location and bearer information etc.

PLMN, as mentioned above, is a network with the objective of providing wireless communication and of interlinking a wireless network with a fixed wired network. A PLMN is identified by a PLMN ID comprising a Mobile Country Code (MCC) and a Mobile Network Code (MNC). Each operator which provides mobile services may have its own PLMN. PLMNs interconnect with other PLMNs and Public Switched Telephone Networks (PSTNs) for telephone communications or with internet service providers for data and internet access of which links are defined as interconnect links between providers.

In 3GPP today, there are mobility situations when the device moves from a source side which may be UTRAN, E-UTRAN, GERAN or another radio access networks to a target GERAN shared network or a target UTRAN shared network. The source side may be either a shared network or a non-shared network. The mobility may be either connected mode mobility or idle mode mobility. Connected mode mobility refers to when a device in connected mode that moves from one place to another and idle mode mobility refers to when a device in idle mode moves from one place to another.

A 3GPP network may be organized using network sharing. A shared network allows different core network operators to connect to a shared RAN. The operators may share the radio network elements and/or radio resources and in addition the core network nodes. The target shared network is shared between core network operators. At network sharing, the 3GPP standard provides two reference architectures; GateWay Core Network (GWCN) and Multi-Operator Core Network (MOCN). In GWCN, core network nodes such as a Mobility Management Entity (MME) or a SGSN is shared between the CN operators in addition to the RAN. In MOCN, only the radio access network is shared between the core network operators.

FIG. 1 illustrates an embodiment of a GWCN configuration for network sharing. FIG. 1 shows an example with three CN nodes operated by three different operators, operator A, B and C. The three CN nodes exemplified in FIG. 1 is: CN Node, operator A 101a, CN Node, operator B 101b and CN Node, operator C 101c. The three MSC/SGSN 103a, 103b, 103c are shared amongst the CN operators A, B and C, and is therefore referred to as a shared MSC/SGSN. The MSC is a network node responsible for coordinating communications channels and processes in the network. The MSC processes requests for service connections from the devices, and routes calls, SMS etc. between the base station and the PSTN. The SGSN performs the same functions as the MSC for voice traffic. Note that three CN operators are illustrated as an example, and that any suitable number of CN operators may be used, such as for example eight. The dotted lines illustrate the connection between the CN node operator A 101a and each of the respective shared MSC/SGSN 103a, 103b, 103c. The thin continuous lines illustrate the connection between the CN node operator B 101b and each of the respective shared MSC/SGSN 103a, 103b, 103c. The thick continuous lines illustrate the connection between the CN node operator C 101c and each of the respective shared MSC/SGSN 103a, 103b, 103c. The Iu interface 104 enables interconnection of the three RNCs, RNC 105a, RNC 105b and RNC 105c with the shared MSC/SGSN 103a, 103b, 103c. The Iu interface 104 is for CS data traffic between the RNCs 105a, 105b, 105c and the MSC and for PS data traffic between the RNCs 105a, 105b, 105c and the SGSN. The RNCs 105a, 105b, 105c are located in the RAN operated by operator X.

FIG. 2 illustrates a MOON configuration for network sharing. FIG. 2 illustrates an example with three CN nodes operated by three operators A, B and C. The exemplified CN nodes are CN node, operator A 201a, CN node, operator B 201b and CN node, operator C 201c. The three CN nodes 201a, 201b, 201c share the same RNC 205. The Iu interface 204 enables interconnection between the RNC 305 and the three CN nodes 201a, 201b, 201c. The RNC 205 is located in the RAN and operated by operator X.

Note that FIGS. 1 and 2 illustrates example embodiments where the RAN node is an RNC, but the skilled person will understand that the RAN node may also be a BSC or an eNB.

Circuit switching is a methodology of implementing the communications network in which two network nodes establish a dedicated communications channel (circuit) through the communications network before the network nodes may communicate. The circuit functions as if the nodes were physically connected as with an electrical circuit. An example of a circuit switched network is the PSTN.

Circuit switching contrasts with packet switching which divides the data to be transmitted into small units, called packets, transmitted through the network independently. Packet switching shares available network bandwidth between multiple communication sessions. Packet switching features delivery of variable bit rate data streams (sequences of packets) over a shared network. When traversing network adapters, switches, routers and other network nodes, packets are buffered and queued, resulting in variable delay and throughput depending on the traffic load in the network.

When the device is camping in LTE there are two methods for providing voice service to the device: Circuit Switched FallBack (CSFB) from LTE to Second Generation/Third Generation (2G/3G) or VoLTE in combination with Single Radio Voice Call Continuity (SRVCC). CSFB defines a mechanism for using a CS network to provide voice services alongside of an LTE network, i.e. a PS network. A CS network may also be referred to as a CS domain and a PS network may also be referred to as a PS domain. Through the CSFB, the device is directed to Wideband Code Division Multiple Access (WCDMA)/GSM to initiate or take a voice call, and the call remains in the CS domain until it is completed, and returns to LTE when finished. Using the inter-technology mobility capabilities of LTE, CSFB allows devices to transition to a legacy CS network to receive voice services and then return to LTE when finished. The CSFB provides support for voice and Short Message Service (SMS). SRVCC is an LTE functionality that provides continuity between the Internet protocol Multimedia Subsystem (IMS) over PS access and CS access for calls that are anchored in IMS when the device is capable of transmitting/receiving on only one of those access networks at a given time.

In conventional networks, the same CN operator may always serve the device in CS and PS domains. In a shared network, supporting devices shall behave as devices in conventional networks with respect to registration with CS and PS domains. A conventional network is defined by the 3GPP as a PLMN consisting of a radio access network and a core network, by which only one serving operator provides services to its subscriber. Subscribers of other operators may receive services by national or international roaming. CS/PS coordination may be described as a method for coordinating the registration of a device in CS and PS domains of a MOON or GWCN. CS/PS coordination is achieved when the same operator is simultaneously serving the device in both the CS domain and the PS domain. In 3GPP today there are situations where CS/PS coordination is not achieved when the device is a GERAN or UTRAN network non-supporting device and/or the target shared network is broadcasting only a common PLMN. One problem is that the PS operator and the CS operator may be selected at different networks, one operator is selected at the source side while the other is selected at the target side and thus there is no common synchronization place. A non-supporting device is a device that does not support network sharing in the sense that it is not able to handle the additional broadcast system information that is specific for network sharing. A supporting device is a device that supports network sharing in the sense that it is able to select a CN operator as the serving operator within a shared network. The parameter common PLMN mentioned above is, according to the 3GPP, a PLMN ID indicated in the system broadcast information as defined for conventional networks, which non-supporting devices understand as the serving operator.

The CS/PS coordination problems may occur in idle mode mobility, in PS handover or CS handover, in non-Dual Transfer Mode (non-DTM) or DTM case, in MOON or a GWCN network. DTM is a protocol that makes it possible for a wireless device to simultaneous transfer CS voice and PS data.

However, if the device changes access in a shared network in idle mode in both the CS domain and the PS domain, the problem does not arise.

SUMMARY

An objective of embodiments herein is therefore to obviate at least one of the above disadvantages and to provide improved CS/PS coordination.

According to a first aspect, the object is achieved by a method in a RAN node for determining which operator that should serve a device when it has been handed over from a source network to a target shared network. The target shared network comprises a registered domain in which the device is registered and a non-registered domain in which the device is not registered. When the device has been handed over to the target shared network, the RAN node transmits, to a non-registered CN node in the non-registered domain, a request for an identity of the device. The RAN node receives information indicating the identity of the device from the non-registered CN node in the non-registered domain. The RAN node transmits a request to CN nodes in the registered domain. The request comprises the identity of the device and is a request for a serving operator which has registered the identified device. The RAN node receives a response from one of the requested CN node in the registered domain. The response comprises information indicating the serving operator which has registered the identified device. The RAN node determines that the same serving operator which served the identified device in the registered domain should also serve the device in the non-registered domain.

According to a second aspect, the object is achieved by a RAN node for determining which operator that should serve a device when it has been handed over from a source network to a target shared network. The target shared network comprises a registered domain in which the device is registered and a non-registered domain in which the device is not registered. The RAN node comprises a transmitter which is adapted to transmit, to a non-registered CN node in the non-registered domain, a request for an identity of the device when the device has been handed over to the target shared network. The RAN node comprises a receiver adapted to receive information indicating the identity of the device from the non-registered CN node in the non-registered domain. The transmitter is further adapted to transmit a request to CN nodes in the registered domain. The request comprises the identity of the device and is a request for a serving operator which has registered the identified device. The receiver is further adapted to receive a response from one of the requested CN node in the registered domain. The response comprises information indicating the serving operator which has registered the identified device. The RAN node further comprises a processor which is adapted to determine that the same serving operator which served the identified device in the registered domain should also serve the device in the non-registered domain.

According to a third aspect, the object is achieved by a method in a registered CN node for determining which operator that should serve the device when it has been handed over from the source network to a target shared network. The target shared network comprises a registered domain in which the device is registered and a non-registered domain in which the device is not registered. The registered CN node receives a request from the RAN node. The request comprises the identity of the device and is a request for a serving operator which has registered the identified device. The registered CN node determines that it is associated with the serving operator which has registered the identified device or that it is not associated with the serving operator which has registered the identified device. The registered CN node transmits a response to the RAN node if it has been determined that it is associated with the serving operator which has registered the identified device. The response comprises information indicating the serving operator which has registered the identified device.

According to a fourth aspect, the objective is achieved by a registered CN node for determining which operator that should serve the device when it has been handed over from the source network to a target shared network. The target shared network comprises a registered domain in which the device is registered and a non-registered domain in which the device is not registered. The registered CN node comprises a receiver which is adapted to receive a request from a RAN node. The request comprises the identity of the device and is a request for a serving operator which has registered the identified device. The registered CN node comprises a determining unit which is adapted to determine that it is associated with the serving operator which has registered the identified device or that it is not associated with the serving operator which has registered the identified device. The registered CN node comprises a transmitter adapted to transmit a response to the RAN node if it has been determined that it is associated with the serving operator which has registered the identified device. The response comprises information indicating the serving operator which has registered the identified device.

According to a fifth aspect, the objective is achieved by a method in the non-registered CN node for determining which operator that should serve the device when it has been handed over from the source network to the target shared network. The target shared network comprises the registered domain in which the device is registered and the non-registered domain in which the device is not registered. The non-registered CN node is in the non-registered domain. When the device has been handed over to the target shared network, the non-registered CN node receives, from the RAN node, a request for the identity of the device. The non-registered CN node transmits information indicating the identity of the device to the RAN node.

According to a sixth aspect, the objective is achieved by a non-registered CN node for determining which operator that should serve the device when it has been handed over from the source network to the target shared network. The target shared network comprises a registered domain in which the device is registered and a non-registered domain in which the device is not registered. The non-registered CN node is in the non-registered domain. The non-registered CN node comprises a receiver adapted to, when the device has been handed over to the target shared network, receive, from a RAN node, a request for an identity of the device. The non-registered CN node comprises a transmitter which is adapted to transmit information indicating the identity of the device to the RAN node.

Since the same operator is used in both domains, CS/PS coordination is improved and the selection made by the source network is kept.

Embodiments herein afford many advantages, of which a non-exhaustive list of examples follows:

An advantage of the embodiments herein is that, after concluded mobility and the device goes to idle and idle mode mobility occurs, the subscriber is using the same CS operator and PS operator.

Another advantage is that the embodiments herein are applicable to several scenarios, such as e.g. idle mode mobility, in PS handover or CS handover, in non-DTM or DTM case, in MOCN or a GWCN network.

Furthermore, another advantage is that CS/PS coordination is achieved but it also means that the selection made by the source network will be kept.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

In a situation a such as when the device performs PS handover or CS handover, the RAN node, e.g. BSC or RNC, retrieves the operator indicated during the handover procedure and uses this operator for the other domain (PS domain or CS domain).

Figure 3:
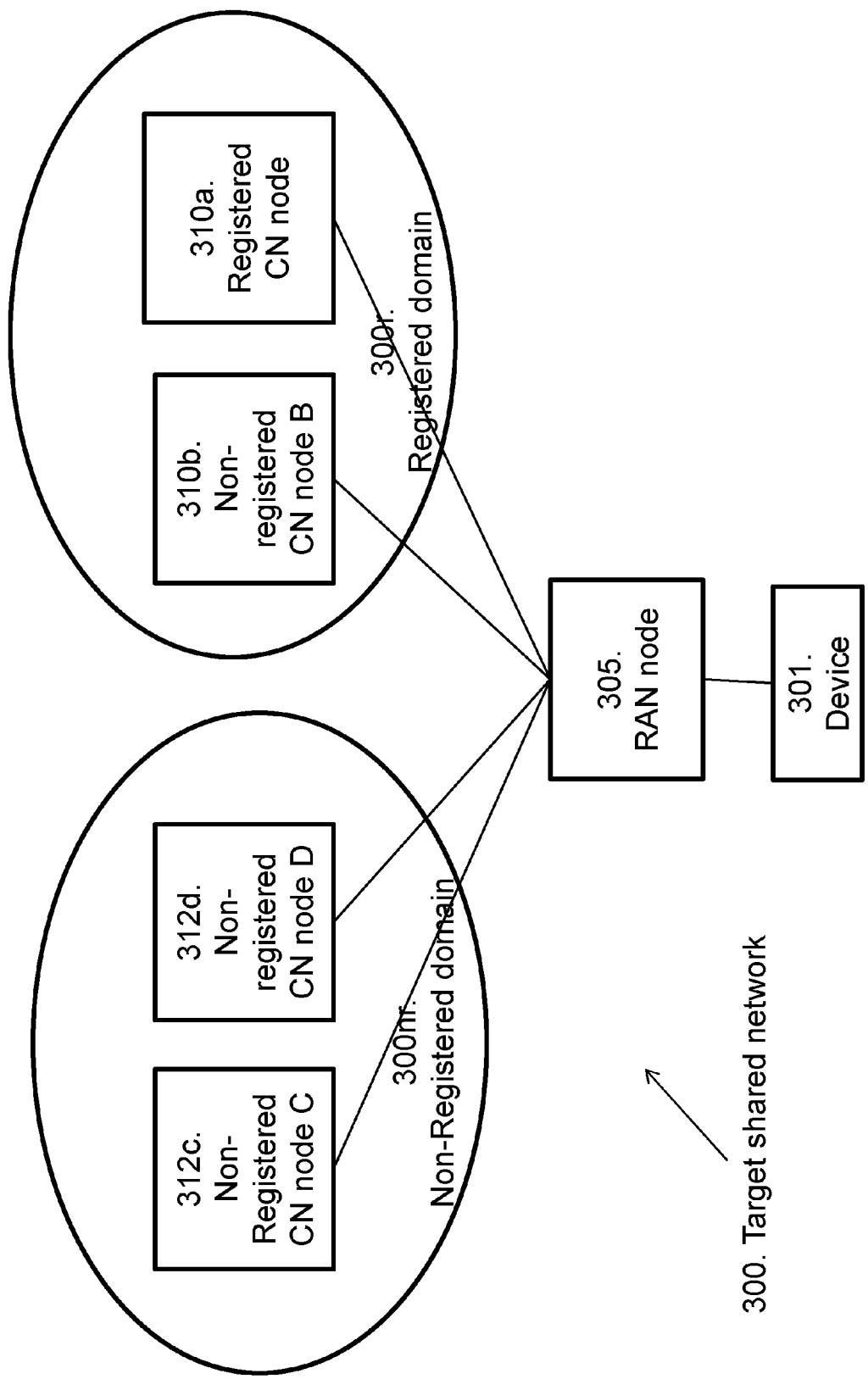
FIG. 3 is a schematic block diagram illustrating embodiments of a communications network.

FIG. 3 depicts a target shared network 300 in which embodiments herein may be implemented. The target shared network 300 may in some embodiments apply to one or more radio access technologies such as for example WCDMA, GSM, GERAN, UTRAN or any other 3GPP radio access technology, or other suitable radio access technologies such as or example Wireless Local Area Network (WLAN).

The target shared network 300 comprises a registered domain 300r in which a device 301 is registered and a non-registered domain 300nr in which the device 301 is not registered. The target shared network 300 may serve a number of PLMNs.

The device 301 is served by a RAN node 305 in the shared network. The RAN node 305 may be a RNC, a BSC or a base station such as a NodeB or any other network unit capable to communicate over a radio carrier with the device 301. The registered domain 300r comprises a registered CN node 310a with which the device 301 is registered. The registered CN node 310a may be a SGSN or MSC. The registered domain 300r may also comprise CN nodes with which the device 301 is not registered (not shown in FIG. 3), such as the non-registered CN node B 310b. The non-registered CN node B 310b may be a SGSN or a MSC. If the reference number 310 is used in the following, it refers to any of the CN nodes in the registered domain 300r, i.e. the registered CN node 310a and/or the non-registered CN node B 310b.

The non-registered domain 300nr comprises two non-registered CN nodes 312, i.e. non-registered CN node C 312c and non-registered CN node D 312d. The non-registered CN nodes 312 may each be a MSC, i.e. MSC C and MSC D, or an SGSN, i.e. SGSN C and SGSN D. The reference number 312, without the letters c or d, is used in the following when referring to any of the non-registered CN nodes C or D.

Thus, the following combinations seen in table 1 below may be possible. The left most column represents the RAN node 305, the middle column represents the non-registered CN node 312, and the right most column represents the registered CN node 310a and the non-registered CN node B 310b. The registered CN node 310a and the non-registered CN node B 310b are always of the same type, e.g. they both are SGSNs or they both are MSCs. This is also the case when there is a plurality of non-registered CN nodes 312 in the non-registered domain 300nr, i.e. the non-registered CN node C 312c and the non-registered CN node D 312d will always be of the same type, e.g. either SGSNs or MSCs.

TABLE 1

| RAN node 305 | Non-registered CN node 312 | Registered CN node 310a and non-registered CN node B 310b |
| --- | --- | --- |
| BSC | MSC | SGSN |
| BSC | SGSN | MSC |
| RNC | MSC | SGSN |
| RNC | SGSN | MSC |

The device 301 may be any device, mobile or stationary, enabled to communicate over the radio channel in the communications network, for instance but not limited to e.g. mobile phone, smart phone, sensors, meters, vehicles, household appliances, medical appliances, media players, M2M devices, cameras, or any type of consumer electronic, for instance but not limited to television, radio, lighting arrangements, tablet computer, laptop or PC. The device 301 may be a supporting or a non-supporting device.

In some embodiments, the registered domain 300r may be referred to as a serving domain and the non-registered domain 300nr may be referred to as a non-serving domain. The registered CN node 310a may be referred to as a serving CN node and the non-registered CN node B 310b, the non-registered CN node C 312c and non-registered CN node D 312d may be referred to as a non-serving CN node(s). In an example with a CS handover, as long as a phone call is ongoing, the device 301 will be registered in a source MSC.

At the same time, the device 301 is served by a target MSC since (re-) registration takes place at the following LAU when the CS phone call is over. Therefore, the term serving may be used instead of registered.

Figure 4:
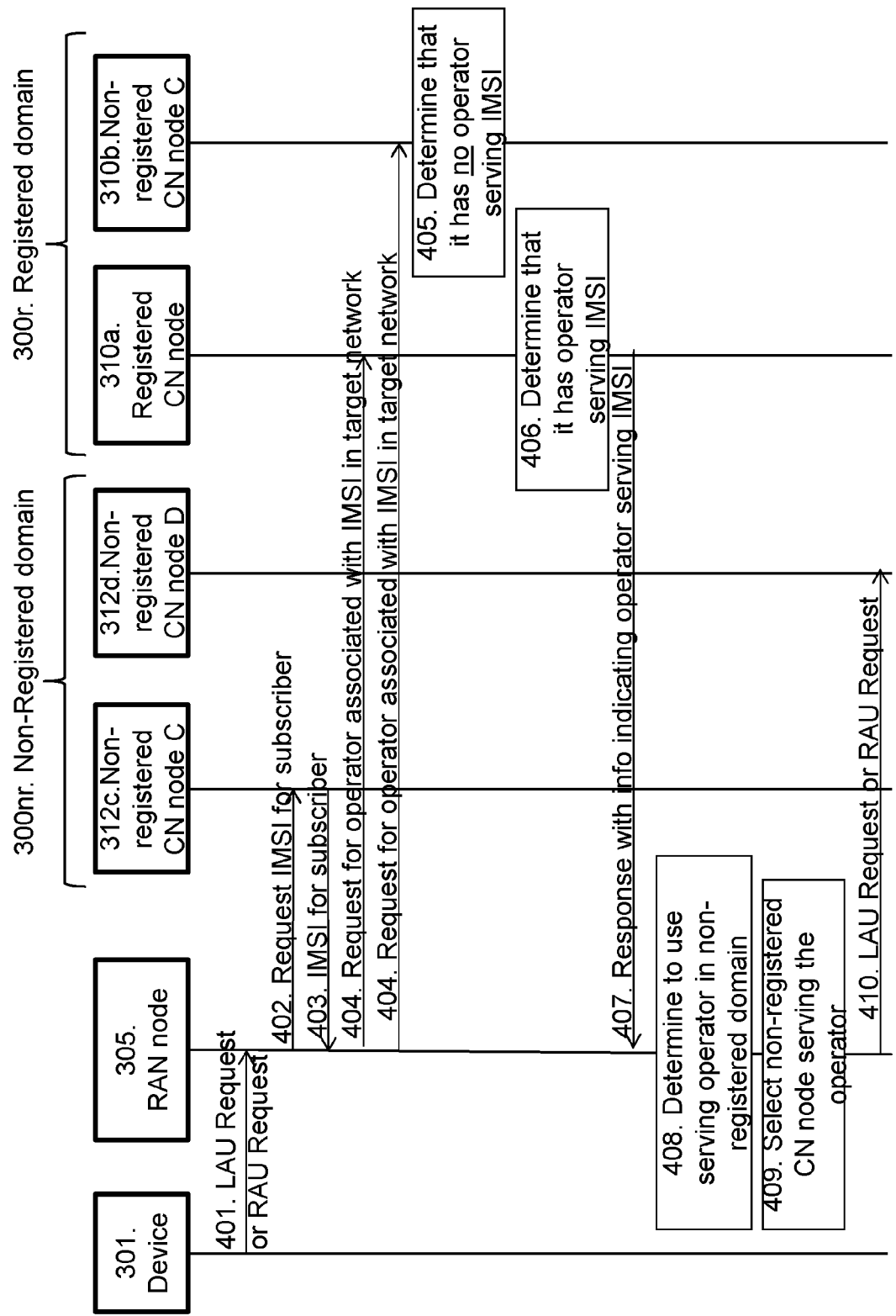
FIG. 4 is a signaling diagram illustrating embodiments of a method in the communications network.

The method for coordinating operators when the device 301 has been handed over to the target shared network 300, according to some embodiments will now be described with reference to the signaling diagram depicted in FIG. 4. Before the method in FIG. 4 takes place, the device 301 has been handed over from a source network to the target shared network 300. FIG. 4 is drawn independently of whether the device 301 performs Location Area Update (LAU) or Routing Area Update (RAU). The device 301 is registered at one node in one domain (CS or PS), while the RAN node 305, e.g. a BSC or RNC, ensures that the device 301 is registered at a node in the other domain for the same operator.

The method comprises the following steps, which steps may be performed in any suitable order than described below:

Step 401

The device 301 transmits a LAU Request or a RAU Request to the RAN node 305. The RAN node 305 may be a BSC or an RNC.

Step 402

The RAN node 305 transmits a request to a non-registered CN node C 312c to which the device 301 is not registered, e.g. a MSC, in a domain in which the device 301 is not registered. The request is a request for the IMSI for a subscriber associated with the device 301. The request is a request for the identity of the device 301. For example, if the handover was a PS handover, the PS operator is already known by the registered CN node 310a, e.g. the SGSN. When the device 301 enters idle mode and then performs a LAU procedure, the RAN node 305 is not able to directly perform a coordinated choice of operator, e.g. choice of a CS operator. The RAN node 305, e.g. BSC or RNC, therefore requests the non-registered CN node C 312c, e.g. MSC, to provide the IMSI for the subscriber. The subscriber is associated with the device 301. The IMSI may be retrieved by using a mechanism of redirection.

The RAN node 305, e.g. BSC or RNC, retrieves the IMSI from a non-registered CN node 312 in the same domain (PS or CS domain) that the incoming mobility message, i.e. the LAU Request or the RAU Request, is considering for. The retrieval of the IMSI may be performed using existing signaling to supported redirection in a MOON network.

Step 403

The non-registered CN node C 312c, e.g. a MSC, transmits a response to the requesting RAN node 305, e.g. BSC or RNC, comprising an indication of the identity of the device 301, e.g. the IMSI for the subscriber.

Step 404

When the subscriber is known by its IMSI, the RAN node 305, e.g. BSC or RNC, continues to match with the serving operator, e.g. the serving PS operator. The RAN node 305, e.g. BSC or RNC, sends requests to all possible connected CN nodes 310 in the registered domain 300r, e.g. SGSNs, whereof one which the device 301 is already registered. In FIG. 4, the request is exemplified to be transmitted to the registered CN node 310a and the non-registered CN node B 310b, however any other suitable number of CN nodes 310 in the registered domain 300r is applicable. The purpose of the request is to retrieve information about which operator, e.g. a PS operator, which is serving the IMSI for the subscriber associated with the device 301.

The RAN node 305, e.g. BSC or RNC, requests all connected CN nodes 310 in the other domain (PS or CS domain) for this subscriber of the used operator. For this purpose also IMSI is included in the request message.

A registered CN node 310a in the registered domain 300r will be associated with the serving operator, however the RAN node 305 which has requested the information indicating the serving operator does not know which of the CN nodes 310 in the registered domain 300r that is the registered CN node 310a and needs to send the request to all CN nodes 310 in the registered domain 300r.

Step 405

The non-registered CN node B 310b in the registered domain 300r uses the IMSI to determine that it has no information about any operator that serves the IMSI.

If the non-registered CN node 310a determines that is has no information about any operator that serves the IMSI the non-registered CN node B 310b may transmit a response indicating that it is not associated with the serving operator or it may not send a response at all to the RAN node 305. Such response is a response to step 404.

Step 406

The registered CN node 310a in the registered domain 300r uses the IMSI to determine that it has information about the serving operator that serves the IMSI.

Step 407

The registered CN node 310a transmits a response, i.e. a response to the request sent in step 404, to the RAN node 305. The response comprises information indicating the serving operator which serves the IMSI. With this, the RAN node 305, e.g. the BSC or RNC, receives a response from a node of the other domain with information about the serving operator.

As mentioned above, the registered domain 300r comprises CN nodes. Only one of the CN nodes in the registered domain 300r is a registered CN node, i.e. the registered CN node 310a.

For the CS domain and in the case of an inter-MSC handover to a shared network, a target MSC is not necessarily a node where the wireless device 301 is registered.

Therefore, in this step 407, the RAN node 305 receives a response with the indicated serving operator which serves the IMSI.

Step 408

The RAN node 305 determines that the serving operator which it received information about in step 407 should also be used in the non-registered domain. Thus the same serving operator is used in both the registered domain 300r and the non-registered domain 300nr.

Step 409

The RAN node 305 selects a non-registered CN node 312, e.g. a MSC, in the domain in which the device 301 is not registered. In FIG. 4, the selected non-registered CN node 312 is the non-registered CN node D 312d. The selected non-registered CN node D 312d serves the same operator as the registered domain operator, e.g. the PS operator.

The RAN node 305, e.g. the BSC or RNC, uses the information about the serving operator of the other domain (PS or CS domain) to select a non-registered CN node 312 serving the same operator, which is in this example the non-registered CN node D 312d.

Step 410

The RAN node 305 transmits or forwards the LAU Request or RAU Request to the selected non-registered CN node D 312d. The LAU Request or RAU request may comprise an indication of the selected serving operator.

The RAN node 305, e.g. the BSC or RNC, sends the incoming LAU Request or RAU Request from step 401 to the non-registered CN node 312 in case of MOON (the non-registered CN node 312 represents an operator) representing this operator, i.e. the serving operator selected in step 408. In FIG. 4, it is the non-registered CN node D 312d which receives the LAU Request or RAU request in step 410. In case of GWCN, the RAN node 305, e.g. the BSC, also includes the selected operator to the selected non-registered CN node D 312d since the selected non-registered CN node D 312d represents all the sharing operators. The incoming LAU Request or RAU Request from step 401 is sent to this GWCN non-registered CN node D 312d. This is summarized in table 2 below where the left most column represents the target shared network 300, the middle column represents the non-registered CN node D 312d and the right most column represents the message sent in step 410.

TABLE 2

| Target shared network 300 | Non-registered CN node D 312d | Message sent in step 410 |
| --- | --- | --- |
| MOCN | Represents one operator (serving operator) | LAU or RAU request |
| GWCN | Represents all sharing operators | LAU or RAU request including selected serving operator |

Figure 5:
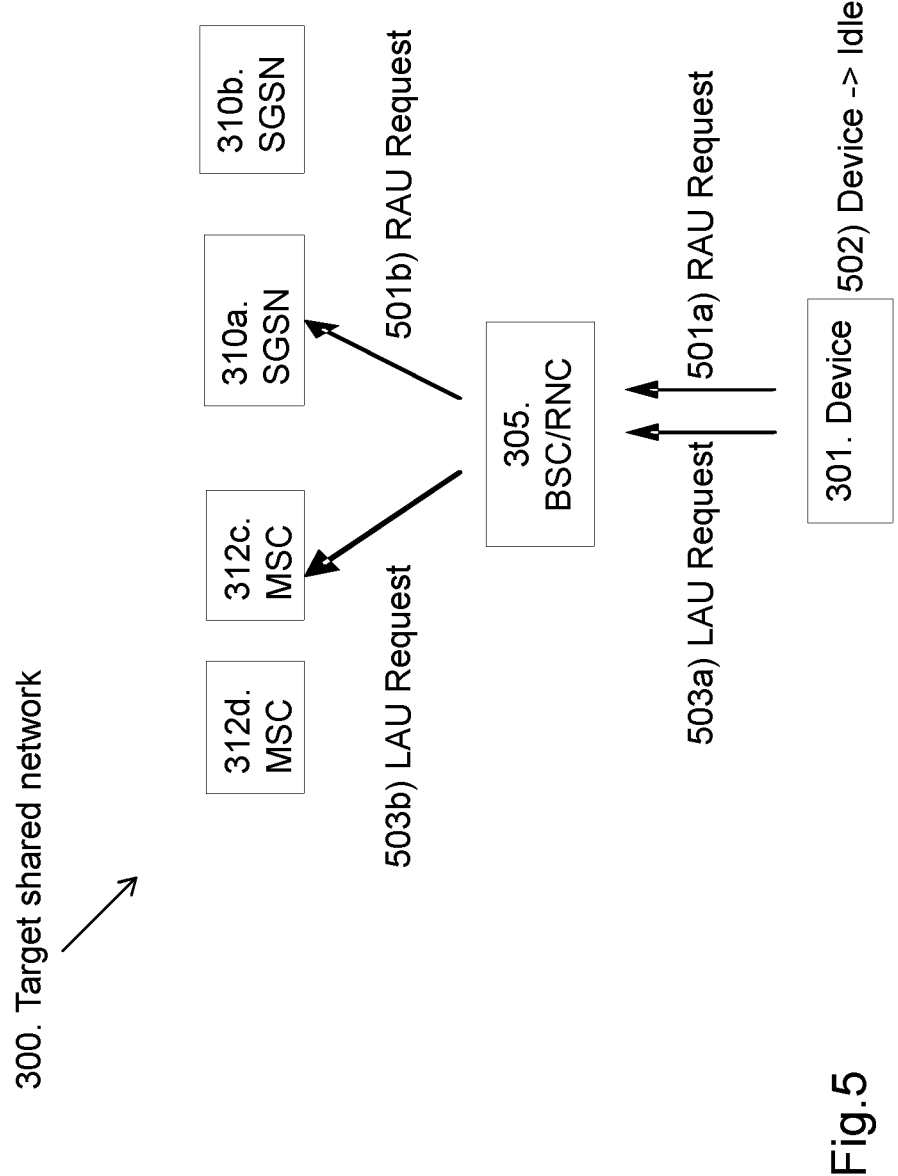
FIG. 5 is a schematic block diagram illustrating embodiments of a communications network and a method in the network.

The method will now be described with reference to FIG. 5 illustrating an embodiment of a method in the target shared network 300. In the example embodiment in FIG. 5, there has been a PS handover, it is based on non-DTM and that the target shared network 300 is a MOON network. In FIG. 5, no combined procedures are used. The device 301 is a non-supporting wireless device in the example in FIG. 5. In FIG. 5, the RAN node 305 is represented by a BSC or a RNC, the non-registered CN nodes C and D 312c,d in the non-registered domain 300nr are represented by a MSCs, the non-registered CN node B 310b in the registered domain 300r is represented by a SGSN and the registered CN node 310a in the registered domain 300r is represented by a SGSN. However, any other suitable nodes may represent the respective nodes in the target shared network 300. The method comprises the following steps, which steps may be performed in any suitable order than described below:

Step 501
A PS handover and a RAU procedure are performed.
Step 501a
This step is a substep of step 501. The device 301 transmits a RAU Request to the BSC or RNC 305. The RAU Request comprises a common PLMN.
Step 501b
This step is a substep of step 501 and a step that is performed after step 501a. The BSC or RNC 305 sends the RAU Request to the SGSN 310a. The RAU Request comprises the common PLMN. The PS operator selection is performed by the source RAN node (not shown) when the PS handover is triggered.
Step 502
The device 301 enters idle mode.
Step 503
A LAU Request procedure is performed, and no RAU procedure is performed after the LAU procedure.
Step 503a
This is a substep of step 503. The device 301 transmits a LAU Request to the BSC or RNC 305. The LAU Request comprises a common PLMN.
Step 503b
This is a substep of step 503 and a step that is performed after step 503a. The BSC or RNC 305 transmits the LAU Request to the MSC 312c. The LAU Request comprises the common PLMN. The CS operator selection is performed by the BSC or RNC 305 on the target side using MOON redirection. The IMSI is received by the MSC 312c.

The MOON redirection is only an example. The CS operator selection may be performed using any other suitable procedure for IMSI retrieval. Such procedure may be included in either an existing procedure within MOON redirection or as a standalone procedure.

With the current technology, no CS/PS coordination is achieved after the LAU procedure. There is a problem since there is no CS/PS coordination as there is no RAU after the LAU when PLMN and routing area are not changed (step 503). This requires synchronization between the operator selection in the source CN/RAN (PS operator) and target BSC (CS operator). Even with a RAU procedure after the LAU procedure there may be a problem since the RAU procedure includes a valid Network Resource Identifier (NRI) which points to the already serving SGSN. However, with the embodiments herein CS/PS coordination is achieved. A possible solution for achieving CS/PS coordination is as follows. When the LAU is received in the BSC or RNC 305 in step 503a, the BSC 305 retrieves the IMSI from the MSC 312c. The BSC or RNC 305 sends a request to all connected SGSNs 310, i.e. SGSN 310a and 310b, for this subscriber and asks for the used PS operator. The BSC or RNC 305 selects CS operator equal to PS operator.

A corresponding method as in FIG. 5 will be performed in case the handover is a CS handover, but this will not be described herein for the sake of simplicity.

Figure 6:
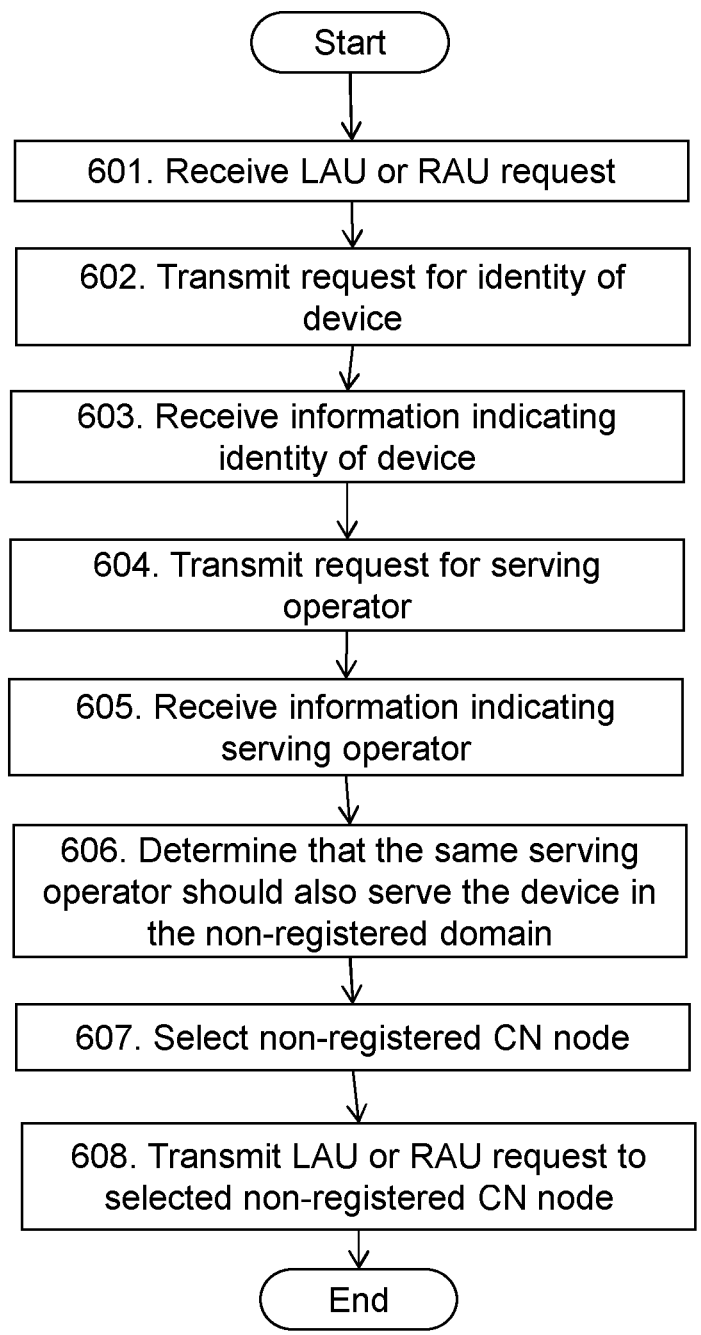
FIG. 6 is a flow chart illustrating embodiments of a method in a RAN node.

The method described above will now be described seen from the perspective of the RAN node 305. FIG. 6 is a flowchart describing the present method in the RAN node 305 for determining which operator that should serve the device 301 when it has been handed over from a source network to a target shared network 300. As mentioned above, the target shared network 300 comprises a registered domain 300r in which the device 301 is registered and a non-registered domain 300nr in which the device 301 is not registered. The registered domain 300r comprises CN nodes, and one of these CN nodes will be the registered CN node 310a. The device 301 may be in idle mode in the non-registered domain 300nr, and the device 301 may be in idle mode or in connected mode in the registered domain 300r. The device 301 may be in DTM or in non-DTM. The device 301 may be a non-supporting device. The target shared network 300 may support both PS and CS. In some embodiments, the registered domain 300r is a PS domain and the non-registered domain 300nr is a CS domain. In some embodiments, the registered domain 300r is a CS domain and the non-registered domain 300nr is a PS domain. The handover of the device 301 may be a CS handover or a PS handover. The target shared network 300 may be a GWCN or a MOON. The RAN node 305 may be a BSC or a RNC. The non-registered CN node 312 in the non-registered domain 300nr may be an MSC or an SGSN. The non-registered CN node B 310b in the registered domain 300r may be a SGSN or a MSC. The registered CN node 310a may be an SGSN or an MSC. Thus, any of the combinations of the nodes as seen in table 1 above may be possible.

The method in FIG. 6 comprises the following steps to be performed by the RAN node 305, which steps may be performed in any suitable order than described below:

Step 601

This step corresponds to step 401 in FIG. 4 and to step 503a in FIG. 5. In some embodiments, the RAN node 305 receives a LAU request or a RAU request from the device 301.

Step 602

This step corresponds to step 402 in FIG. 4 and step 503a in FIG. 5. When the device 301 has been handed over to the target shared network 300, the RAN node 305 transmits, to a non-registered CN node 312 in the non-registered domain 300nr, a request for an identity of the device 301.

Step 603

This step corresponds to step 403 in FIG. 4 and to step 503b in FIG. 5. The RAN node 305 receives information indicating the identity of the device 301 from the non-registered CN node 312 in the non-registered domain 300nr.

Step 604

This step corresponds to step 404 in FIG. 4 and to step 503b in FIG. 5. The RAN node 305 transmits a request to CN nodes 310 in the registered domain 300r. The request comprises the identity of the device 301 and is a request for a serving operator which has registered the identified device 301.

Step 605

This step corresponds to step 407 in FIG. 4. The RAN node 305 receives a response from one of the requested CN nodes 310 in the registered domain 300r. The response comprises information indicating the serving operator which has registered the identified device 301. The response may be from the registered CN node 310a.

Step 606

This step corresponds to step 408 in FIG. 4. The RAN node 305 determines that the same serving operator which served the identified device in the registered domain 300r should also serve the device 301 in the non-registered domain 300nr.

Step 607

This step corresponds to step 409 in FIG. 4. In some embodiments, the RAN node 305 selects a non-registered CN node 312 which is associated with the determined serving operator. The device 301 is to be registered with the non-registered CN node 312.

Step 608

This step corresponds to step 410 in FIG. 4. In some embodiments, the RAN node 305 transmits a LAU request or a RAU request to the selected non-registered CN node 312 in the non-registered domain 300nr.

The LAU request or the RAU request transmitted to the selected non-registered CN node 312 may comprise the determined serving operator when the selected non-registered CN node 312 represents all sharing operators and when the target shared network 300 is a GWCN. In other words, to be able to handle GWCN, the identity of the serving operator for the non-registered domain 300nr may be included in the signaling towards the non-registered CN node 312 in the non-registered domain 300nr.

The LAU request or the RAU request is transmitted to the selected non-registered CN node 312 representing the serving operator when the target shared network 300 is a MOON.

Figure 7:
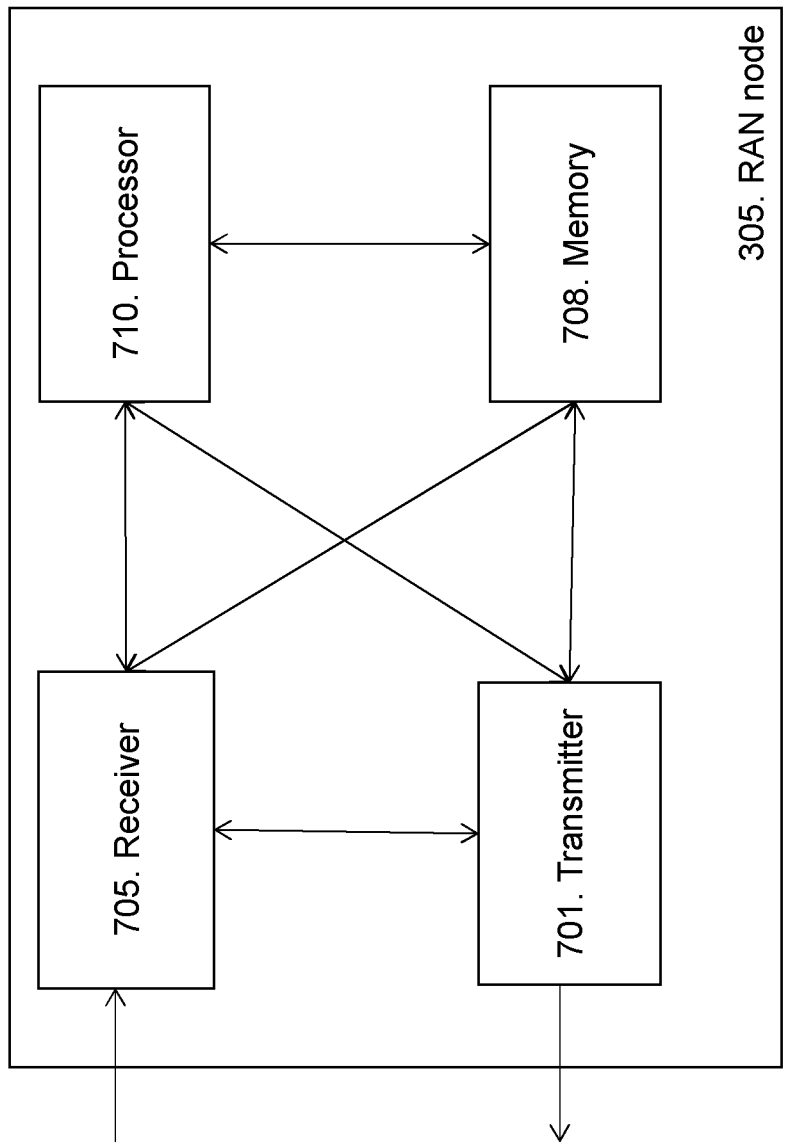
FIG. 7 is a schematic block diagram illustrating embodiments of a RAN node.

To perform the method steps described above and shown in FIGS. 4, 5 and 6 the RAN node 305 comprises an arrangement as shown in FIG. 7. The RAN node 305 is arranged to determining which operator that should serve the device 301 when it has been handed over from the source network to the target shared network 300. The target shared network 300 comprises the registered domain 300r in which the device 301 is registered and the non-registered domain 300nr in which the device 301 is not registered. The device 301 may be in idle mode in the non-registered domain 300nr. The device 301 may be in idle mode or in connected mode in the registered domain 300r. The device 301 may be in DTM or in non-DTM. The device 301 may be a non-supporting device. The target shared network 300 may support both PS and CS. In some embodiments, the registered domain 300r is a PS domain and the non-registered domain 300nr is a CS domain. In some embodiments, the registered domain 300r is a CS domain and the non-registered domain 300nr is a PS domain. The handover of the device 301 may be a CS handover or a PS handover. The target shared network 300 is a GWCN or a MOON. The RAN node 305 may be a BSC or a RNC. The non-registered CN node 312 may be a MSC or a SGSN. The registered CN node 310a may be a SGSN or a MSC.

The RAN node 305 comprises a transmitter 701 adapted to transmit the request to the second registered CN node 312, to transmit the request for information indicating the serving operator to the first registered CN node 310a and to transmit or forward the RAU Request or LAU request to the selected non-registered CN node 312. The transmitter 701 is adapted to transmit, to the non-registered CN node 312 in the non-registered domain 300nr, a request for the identity of the device 301 when the device 301 has been handed over to the target shared network 300. The transmitter 701 is adapted to transmit a request to CN nodes 310 in the registered domain 300r. The request comprises the identity of the device 301 and is a request for a serving operator which has registered the identified device 301. The transmitter 701 may be adapted to transmit the LAU request or the RAU request to the selected non-registered CN node 312 in the non-registered domain 300nr. The LAU request or RAU request transmitted to the selected non-registered CN node 312 comprises the determined serving operator when the selected non-registered CN node 312 represents all sharing operators and when the target shared network 300 is a GWCN. The LAU request or the RAU request is transmitted to the selected non-registered CN node 312 representing the serving operator when the target shared network 300 is a MOON.

The RAN node 305 comprises a receiver 705 adapted to receive the RAU request or LAU request from the device 305, receive information indicating the identity, e.g. I MSI, from the second registered CN node 312 and to receive a response from the first registered CN node 310a. The receiver 705 is adapted to receive the RAU request or LAU request from the device 305, receive information indicating the identity, e.g. IMSI, from the second registered CN node 312 and to receive a response from the first registered CN node 310a. The receiver 705 is adapted to receive information indicating the identity of the device 301 from the non-registered CN node 312 in the non-registered domain 300nr. The receiver 705 is adapted to receive a response from one of the requested CN node 310 in the registered domain 300r. The response comprises information indicating the serving operator which has registered the identified device 301. The receiver 705 may be further adapted to receive the LAU request or the RAU request from the device 301.

The RAN node 305 may further comprise a memory 708 comprising one or more memory units. The memory 608 is arranged to be used to store data, received data streams, power level measurements, RAU requests, LAU requests, information indicating serving operator, IMSI, common PLMN, handover information, and applications to perform the methods herein when being executed in the RAN node 305.

The RAN node 305 comprises a processor 710 which is adapted to determine that the same serving operator which served the identified device in the registered domain 300*r* should also serve the device 301 in the non-registered domain 300*nr*. The processor 710 may be further adapted to select a non-registered CN node 312 which is associated with the determined serving operator. The device 301 is to be registered with the non-registered CN node 312.

Figure 8:
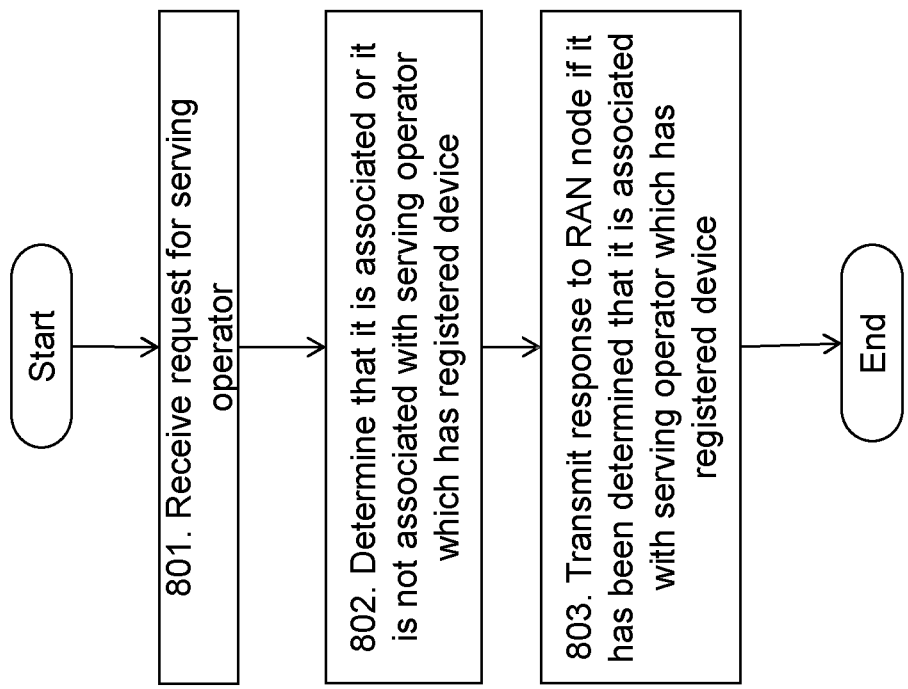
FIG. 8 is a flow chart illustrating embodiments of a method in a registered CN node.

The method described above will now be described seen from the perspective of the registered CN node 310*a*. FIG. 8 is a flowchart describing the present method in the registered CN node 310*a* for determining which operator that should serve the device 301 when it has been handed over from the source network to the target shared network 300. The target shared network 300 comprises the registered domain 300*r* in which the device 301 is registered and the non-registered domain 300*nr* in which the device 301 is not registered. The device 301 may be in idle mode in the non-registered domain 300*nr*, and the device 301 may be in idle mode or in connected mode in the registered domain 300*r*. The device 301 may be in DTM or in non-DTM. The device 301 may be a non-supporting device. The target shared network 300 may support both PS and CS. In some embodiments, the registered domain 300*r* is a PS domain and the non-registered domain 300*nr* is a CS domain. In some embodiments, the registered domain 300*r* is a CS domain and the non-registered domain 300*nr* is a PS domain. The handover of the device 301 may be a CS handover or a PS handover. The target shared network 300 may be a GWCN or a MOON. The RAN node 305 may be a BSC or a RNC. The non-registered CN node 312 is a MSC or a SGSN. The registered CN node 310*a* may be a SGSN or a MSC.

The method comprises the following steps to be performed by the registered CN node 310*a* in the registered domain 300*r*, which steps may be performed in any suitable order than described below:

Step 801

This step corresponds to step 404 in FIG. 4. The registered CN node 310*a* receives a request from the RAN node 305. The request comprises the identity of the device 301 and is a request for a serving operator which has registered the identified device 301.

Step 802

This step corresponds to steps 405 and 406 in FIG. 4. The registered CN node 310*a* determines that it is associated with the serving operator which has registered the identified device 301 or that it is not associated with the serving operator which has registered the identified device 301.

Step 803

This step corresponds to step 407 in FIG. 4. The registered CN node 310*a* transmits a response to the RAN node 305 when it has been determined that it is associated with the serving operator which has registered the identified device 301. The response comprises information indicating the serving operator which has registered the identified device 301. The registered CN node 310*a* will be associated with the serving operator.

Figure 9:
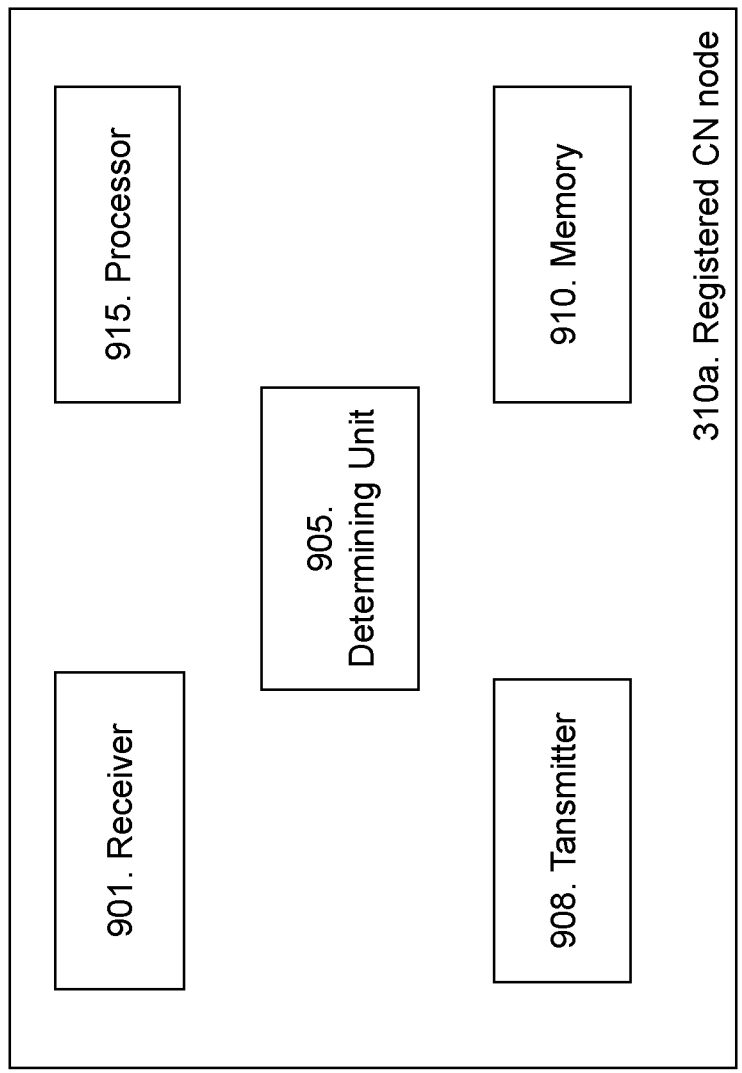
FIG. 9 is a schematic block diagram illustrating embodiments of a registered CN node.

To perform the method steps described above and shown in FIGS. 4, 5 and 8, the registered CN node 310*a* comprises an arrangement as shown in FIG. 9. The registered CN node 310*a* is arranged to for determining which operator that should serve the device 301 when it has been handed over from a source network to a target shared network 300. The target shared network 300 comprises the registered domain 300*r* in which the device 301 is registered and the non-registered domain 300*nr* in which the device 301 is not registered. The device 301 may be in idle mode in the non-registered domain 300*nr*. The device 301 may be in idle mode or in connected mode in the registered domain 300*r*. The device 301 may be in DTM or in non-DTM. The device 301 may be a non-supporting device. The target shared network 300 may support both PS and CS. In some embodiments, the registered domain 300*r* is a PS domain and the non-registered domain 300*nr* is a CS domain. In some embodiments, the registered domain 300*r* is a CS domain and the non-registered domain 300*nr* is a PS domain. The handover of the device 301 may be a CS handover or a PS handover. The target shared network 300 is a GWCN or a MOON. The RAN node 305 may be a BSC or a RNC. The non-registered CN node 312 may be a MSC or a SGSN. The registered CN node 310*a* may be a SGSN or a MSC.

The registered CN node 310*a* comprises a receiver 901 which is adapted to receive a request from the RAN node 305. The request comprises the identity of the device 301 and is a request for a serving operator which has registered the identified device 301.

The registered CN node 310*a* comprises a determining unit 905 which is adapted to determine that it is associated with the serving operator which has registered the identified device 301 or that it is not associated with the serving operator which has registered the identified device 301.

The registered CN node 310*a* comprises a transmitter 908 which is adapted to transmit a response to the RAN node 305 if it has been determined that it is associated with the serving operator which has registered the identified device 301. The response comprises information indicating the serving operator which has registered the identified device 301.

The registered CN node 310*a* may further comprise a memory 910 comprising one or more memory units. The memory 910 is arranged to be used to store data, received data streams, requests, responses, device identity, information indicating the serving operator, threshold values, time periods, configurations, scheduling, and applications to perform the methods herein when being executed in the registered CN node 310*a*.

The registered CN node 310*a* may further comprise a processor 915 which controls at least some of the units in the registered CN node 310 via the memory 910. The processor 915 will be described in more detail below.

Figure 10:
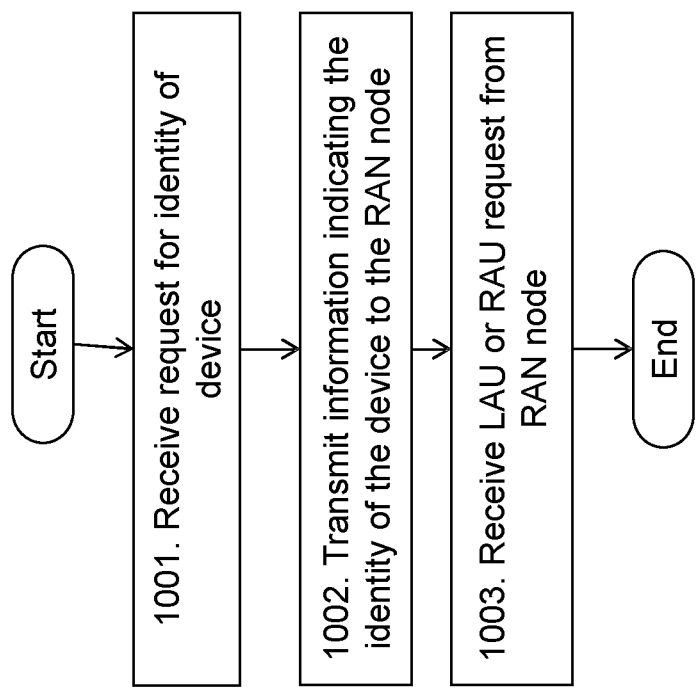
FIG. 10 is a flow chart illustrating embodiments of a method in a non-registered CN node.

The method described above will now be described seen from the perspective of the non-registered CN node 312. The registered CN node 312 may be any of the two registered CN nodes 312*c*, 312*d* exemplified in FIG. 3. FIG. 10 is a flowchart describing the present method in the non-registered CN node 312 for determining which operator that should serve the device 301 when it has been handed over from the source network to the target shared network 300. The target shared network 300 comprises the registered domain 300*r* in which the device 301 is registered and the non-registered domain 300*nr* in which the device 301 is not registered. The non-registered CN node 312 is in the non-registered domain 300*nr*. The device 301 may be in idle mode in the non-registered domain 300*nr*, and the device 301 may be in idle mode or in connected mode in the registered domain 300*r*. The device 301 may be in DTM or in non-DTM. The device 301 may be a non-supporting device. The target shared network 300 may support both PS and CS. In some embodiments, the registered domain 300*r* is a PS domain and the non-registered domain 300*nr* is a CS domain. In some embodiments, the registered domain 300*r* is a CS domain and the non-registered domain 300nr is a PS domain. The handover of the device 301 may be a CS handover or a PS handover. The target shared network 300 may be a GWCN or a MOON. The RAN node 305 may be a BSC or a RNC. The non-registered CN node 312 may be a MSC or a SGSN. The registered CN node 310a may be a SGSN or a MSC.

The method to be performed by the non-registered CN node 312 comprises the following steps, which steps may be performed in any suitable order than described below:

Step 1001

Figure 1:
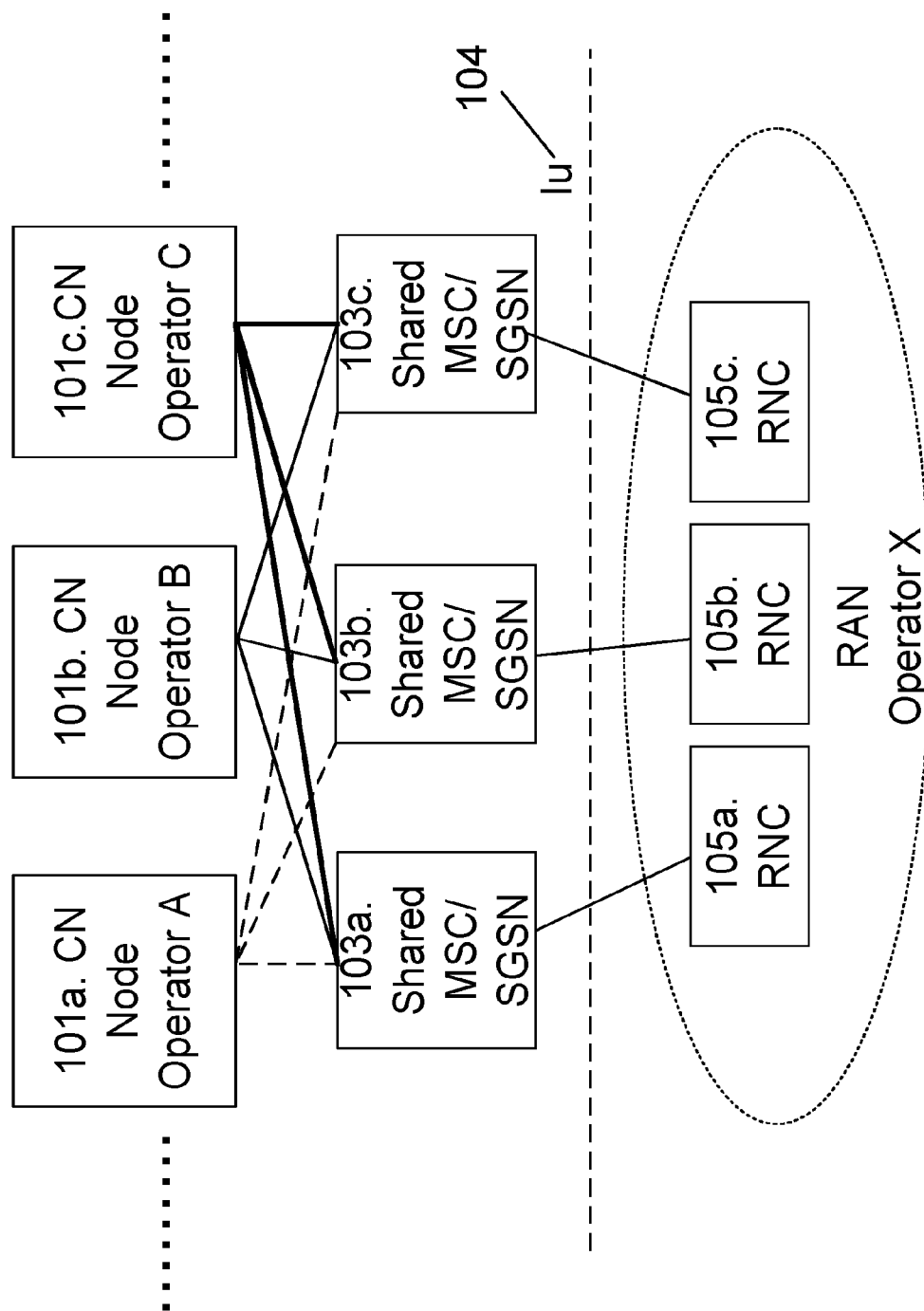
FIG. 1 is a schematic block diagram illustrating embodiments of a GWCN configuration for network sharing.
Figure 2:
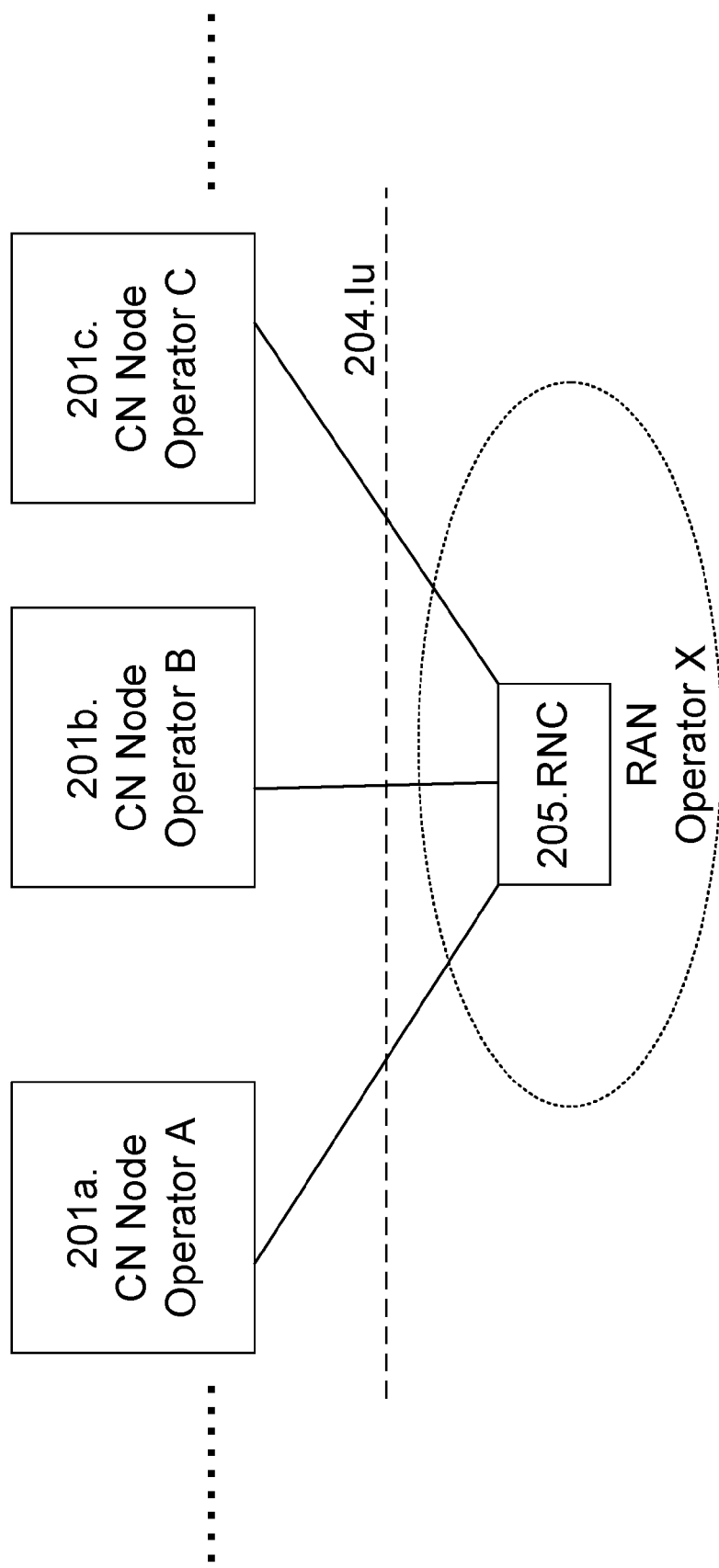
FIG. 2 is a schematic block diagram illustrating embodiments of a MOON configuration for network sharing.

This step corresponds to step 402 in FIG. 2 and step 503b in FIG. 5. When the device 301 has been handed over to the target shared network 300, the non-registered CN node 312 receives, from the RAN node 305, a request for the identity of the device 301.

Step 1002

The non-registered CN node 312 transmits information indicating the identity of the device 301 to the RAN node 305.

Step 1003

This step corresponds to step 410 in FIG. 4. In some embodiments, the non-registered CN node 312 receives a LAU request or a RAU request from the RAN node 305. The LAU request or the RAU request received from the RAN node 305 may comprise a serving operator determined by the RAN node 305 when the non-registered CN node 312 represents all sharing operators and when the target shared network 300 is a GWCN.

The non-registered CN node 312 may represent a serving operator determined by the RAN node 305 when the target shared network 300 is a MOON.

Figure 11:
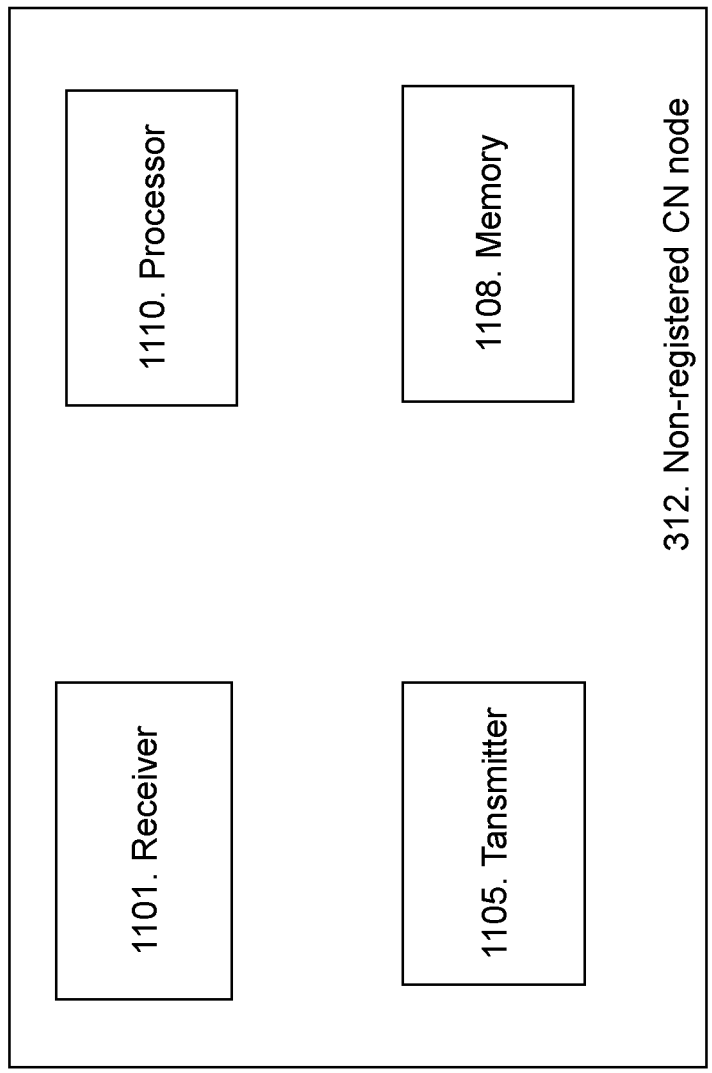
FIG. 11 is a schematic block diagram illustrating embodiments of a non-registered CN node.

To perform the method steps described above and shown in FIGS. 4, 5 and 10, the non-registered CN node 312 comprises an arrangement as shown in FIG. 11. The non-registered CN Node 312 is arranged to determining which operator that should serve the device 301 when it has been handed over from the source network to the target shared network 300. The target shared network 300 comprises the registered domain 300r in which the device 301 is registered and the non-registered domain 300nr in which the device 301 is not registered. The non-registered CN node 312 is in the non-registered domain 300nr. The device 301 may be in idle mode in the non-registered domain 300nr and the device 301 may be in idle mode or in connected mode in the registered domain 300r. The device 301 may be in DTM or in non-DTM. The device 301 is a non-supporting device. The target shared network 300 may support both PS and CS. In some embodiments, the registered domain 300r is a PS domain and the non-registered domain 300nr is a CS domain. In some embodiments, the registered domain 300r is a CS domain and the non-registered domain 300nr is a PS domain. The handover of the device 301 may be a CS handover or a PS handover. The target shared network 300 may be a GWCN or a MOON. As mentioned earlier, the RAN node 305 is a BSC or a RNC. The non-registered CN node 312 may be a MSC or a SGSN and the registered CN node 310a may be a SGSN or a MSC.

The non-registered CN node 312 comprises a receiver 1101 which is adapted to, when the device 301 has been handed over to the target shared network 300, receive, from the RAN node 305 a request for an identity of the device 301. The receiver 1101 may be further adapted to receive the LAU request or the RAU request from the RAN node 305. The LAU request or RAU request received from the RAN node 305 may comprise a serving operator determined by the RAN node 305 when the non-registered CN node 312 represents all sharing operators and when the target shared network 300 is a GWCN. The non-registered CN node 312 may represent a serving operator determined by the RAN node 305 when the target shared network 300 is a MOON.

The non-registered CN node 312 comprises a transmitter 1105 which is adapted to transmit information indicating the identity of the device 301 to the RAN node 305.

The non-registered CN node 312 may further comprise a memory 1108 comprising one or more memory units. The memory 1108 is arranged to be used to store data, received data streams, requests, responses, device identity, LAU requests, RAU requests, information indicating the serving operator, threshold values, time periods, configurations, scheduling, and applications to perform the methods herein when being executed in the registered CN node 310a.

The non-registered CN node 312 may further comprise a processor 1110 which controls at least some of the units in the registered CN node 312 via the memory 1108. The processor 1110 will be described in more detail below.

The present mechanism for determining which operator that should serve the device 301 when it has been handed over from a source network to a target shared network 300 may be implemented through one or more processors, such as the processor 710 in the RAN node arrangement depicted in FIG. 7 and/or the processor 915 in the registered CN node arrangement depicted in FIG. 9 and/or the processor 1110 in the non-registered CN node arrangement depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the RAN node 305. One such carrier may be in the form of a CD ROM disc. It is however feasible with other data carriers such as a memory stick. The computer program code can furthermore be provided as pure program code on a server and downloaded to the RAN node 705 and/or the registered CN node 310a and/or the non-registered CN node 312.

Some example implementations of the embodiments illustrated above will now be described.

Although the described embodiments may be implemented in any appropriate type of telecommunication system supporting any suitable communication standards and using any suitable components, particular embodiments of the described solutions may be implemented in a network, such as that illustrated in FIG. 3.

The example network may further include any additional elements suitable to support communication between devices 305 or between a wireless device and another communication device, such as a landline telephone. Although the illustrated device 301 may represent a communication device that includes any suitable combination of hardware and/or software, this device 301 may, in particular embodiments, represent a device such as the example wireless device 1200 illustrated in greater detail by FIG. 12. Similarly, although the illustrated network nodes may represent network nodes that includes any suitable combination of hardware and/or software, these network nodes may, in particular embodiments, represent devices such as the example network node 1300 illustrated in greater detail by FIG. 13.

Figure 12:
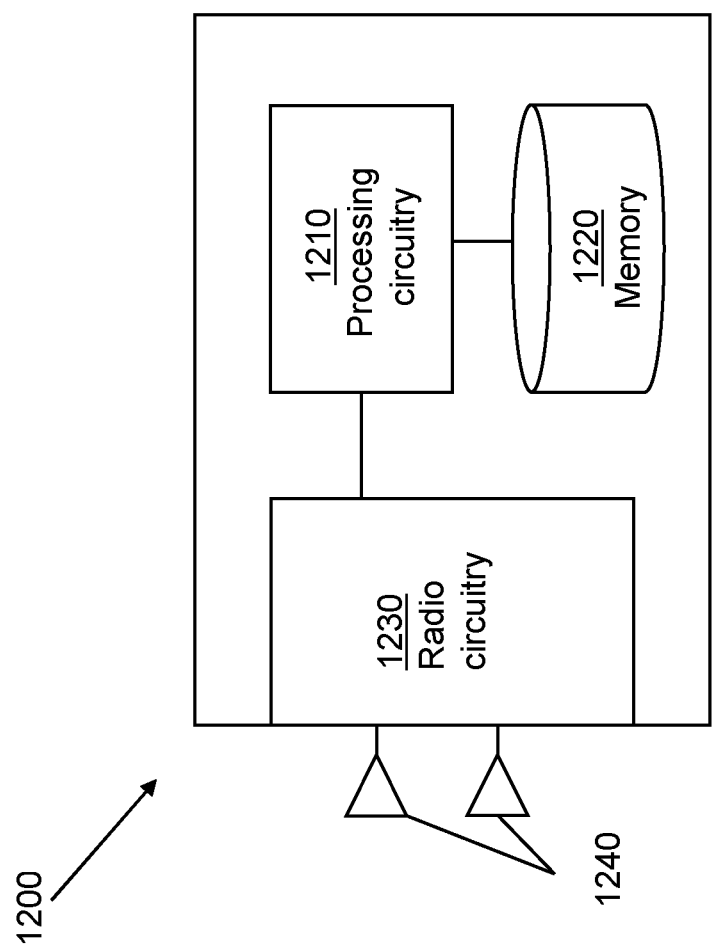
FIG. 12 is a schematic block diagram illustrating embodiments of a device.

As shown in FIG. 12, the example wireless device 1200 includes processing circuitry 1210, a memory 1220, radio circuitry 1230 and at least one antenna 1240. The radio circuitry may comprise RF circuitry and baseband processing circuitry (not shown). In particular embodiments, some or all of the functionality described above as being provided by mobile communication devices or other forms of wireless device may be provided by the processing circuitry 1210 executing instructions stored on a computer-readable medium, such as the memory 1220 shown in FIG. 12. Alternative embodiments of the wireless device 1200 may include additional components beyond those shown in FIG. 12 that may be responsible for providing certain aspects of the wireless device's functionality, including any of the functionality described above and/or any functionality necessary to support the solution described above.

Figure 13:
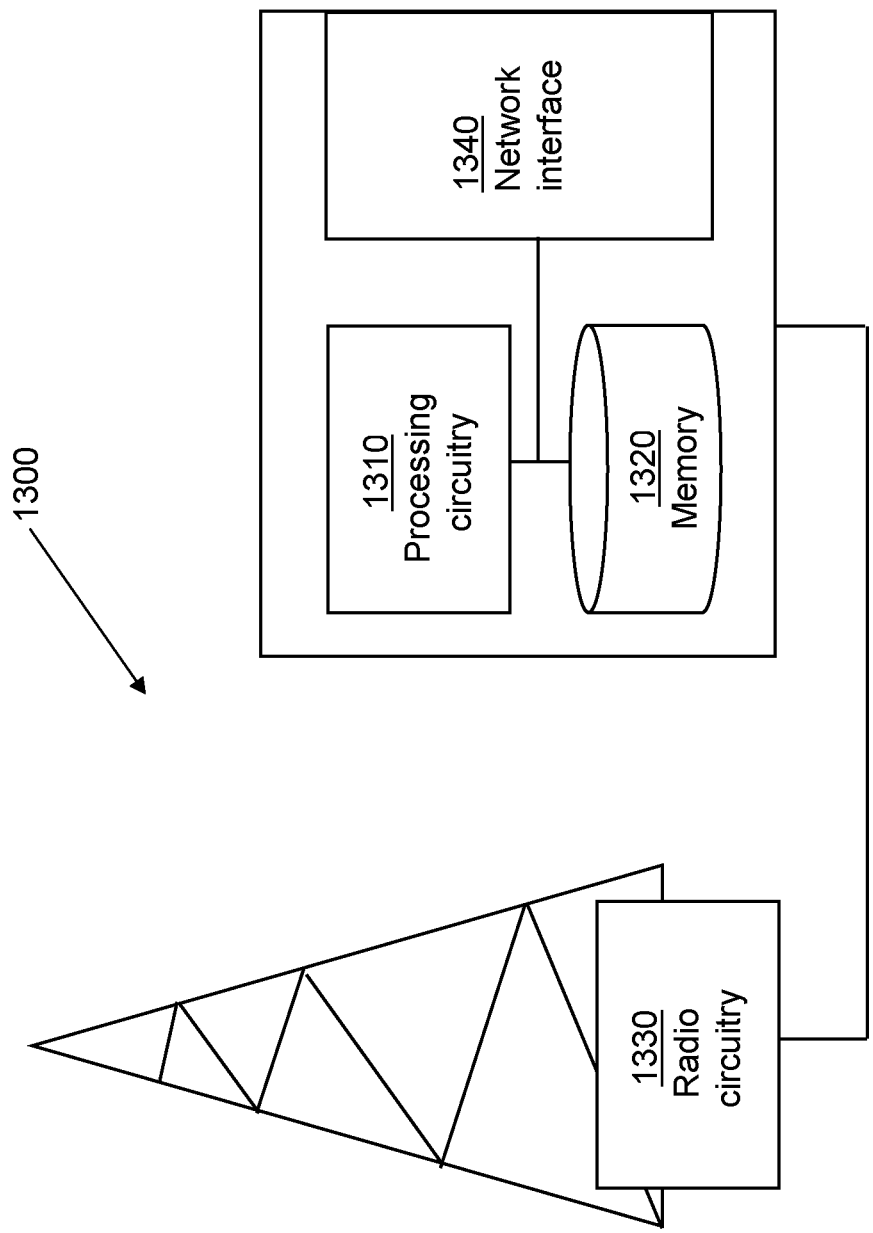
FIG. 13 is a schematic block diagram illustrating embodiments of a network node.

As shown in FIG. 13, the example network node 1300 includes processing circuitry 1310, a memory 1320, radio circuitry 1330, network interface 1340 and at least one antenna (not shown). The processing circuitry 1320 may comprise RF circuitry and baseband processing circuitry (not shown). In particular embodiments, some or all of the functionality described above as being provided by a mobile base station, a base station controller, a relay node, a NodeB and/or any other type of mobile communications node may be provided by the processing circuitry 1310 executing instructions stored on a computer-readable medium, such as the memory 1320 shown in FIG. 13. Alternative embodiments of the network node 1300 may include additional components responsible for providing additional functionality, including any of the functionality identified above and/or any functionality necessary to support the solution described above.

Those skilled in the art will understand that the different options may be directly predicted and obtained from the examples that have been shown in the description.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods, without departing from the embodiments herein, be performed in another order than the order in which they appear.

The invention claimed is:

1. A method in a Radio Access Network (RAN) node for determining which serving operator should serve a device when the device has been handed over from a source network to a target network, wherein the target network is a shared network shared by a plurality of serving operators and comprises a registered domain in which the device is registered and a non-registered domain in which the device is not registered, wherein the device is registered with one of said plurality of serving operators, the method comprising:

when the device has been handed over to the target shared network, transmitting, by the RAN node, to a non-registered Core Network (CN) node in the non-registered domain a request for an identity of the device, wherein the request for the identity of the device does not include information indicating the identity of the device;

receiving, at the RAN node, a response to the request for the identity of the device from the non-registered CN node, said response comprising said information indicating the identity of the device;

after receiving the response comprising the information indicating the identity of the device, the RAN node transmitting to a CN node in the registered domain a request for information indicating an identity of the serving operator with which the device is registered, wherein the transmitted request comprises the information indicating the identity of the device;

after transmitting the request for information indicating the identity of the serving operator, receiving from the CN node in the registered domain a message comprising information indicating the identity of the serving operator with which the device is registered; and determining that the serving operator with which the device is registered should serve the device in the non-registered domain.

2. The method according to claim 1, further comprising: selecting a non-registered CN node which is associated with the serving operator with which the device is registered.

3. The method according to claim 2, further comprising: transmitting a Location Area Update (LAU) request or a Routing Area Update, RAU, request to the selected non-registered CN node in the non-registered domain.

4. The method according to claim 3, wherein the LAU request or RAU request transmitted to the selected non-registered CN node comprises the determined serving operator when the selected non-registered CN node represents all sharing operators and when the target shared network is a GateWay Core Network (GWCN).

5. The method according to claim 3, wherein the LAU request or the RAU request is transmitted to the selected non-registered CN node representing the serving operator when the target shared network is a Multi Operator Core Network (MOCN).

6. The method according to claim 1, further comprising: receiving a Location Area Update (LAU) request or a Routing Area Update (RAU) request from the device.

7. The method according to claim 1, wherein the device is in idle mode in the non-registered domain.

8. The method according to claim 1, wherein the device is in idle mode or in connected mode in the registered domain.

9. The method according to claim 1, wherein the device is in Dual Transfer Mode, DTM, or in non-Dual Transfer Mode, non-DTM.

10. The method according to claim 1, wherein the device is a non-supporting device.

11. The method according to claim 1, wherein the target shared network supports both Packet Switching (PS) and Circuit Switching (CS) and wherein the registered domain is a PS domain and the non-registered domain is a CS domain, or the registered domain is a CS domain and the non-registered domain is a PS domain;

and wherein the handover of the device is a CS handover or a PS handover.

12. The method according to claim 1, wherein the target shared network is a GateWay Core Network (GWCN) or a Multi Operator Core Network (MOCN).

13. The method according to claim 1, wherein the RAN node is a Base Station Controller (BSC) or a Radio Network Controller (RNC) wherein the non-registered CN node is a Mobile Switching Center (MSC) or a Serving General packet radio service Support Node (SGSN), and wherein the registered CN node is a SGSN or a MSC.

14. A Radio Access Network (RAN) node for determining which serving operator should serve a device when the device has been handed over from a source network to a target network, wherein the target network comprises a registered domain in which the device is registered and a non-registered domain in which the device is not registered, the RAN node comprising:
a transmitter adapted to transmit, to a non-registered Core Network (CN) node in the non-registered domain, a request for an identity of the device when the device has been handed over to the target shared network; and
a receiver adapted to receive information indicating the identity of the device from the non-registered CN node in the non-registered domain;
wherein the transmitter is further adapted to:
transmit a request to CN nodes in the registered domain, wherein the request comprises the identity of the device and is a request for a serving operator which has registered the identified device;
wherein the receiver is further adapted to:
receive a response from one of the requested CN node in the registered domain, wherein the response comprises information indicating the serving operator which has registered the identified device; and
wherein the RAN node further comprises:
a processor adapted to determine that the same serving operator which served the identified device in the registered domain should also serve the device in the non-registered domain.

15. The RAN node according to claim 14, wherein the processor is further adapted to:
select a non-registered CN node which is associated with the determined serving operator, wherein the device is to be registered with the non-registered CN node.

16. The RAN node according to claim 15, wherein the transmitter is further adapted to:
transmit a Location Area Update (LAU) request or a Routing Area Update (RAU) request to the selected non-registered CN node in the non-registered domain.

17. The RAN node according to claim 16, wherein the LAU request or RAU request transmitted to the selected non-registered CN node comprises the determined serving operator when the selected non-registered CN node represents all sharing operators and when the target shared network is a GateWay Core Network (GWCN).

18. The RAN node according to claim 17, wherein the LAU request or the RAU request is transmitted to the selected non-registered CN node representing the serving operator when the target shared network is a Multi Operator Core Network (MOCN).

19. The RAN node according to claim 14, wherein the receiver is further adapted to:
receive a Location Area Update (LAU) request or a Routing Area Update (RAU) request from the device.

20. The RAN node according to claim 14, wherein the device is in idle mode in the non-registered domain.

21. The RAN node according to claim 14, wherein the device is in idle mode or in connected mode in the registered domain.

22. The RAN node according to claim 14, wherein the device is in Dual Transfer Mode, DTM, or in non-Dual Transfer Mode, non-DTM.

23. The RAN node according to claim 14, wherein the device is a non-supporting device.

24. The RAN node according to claim 14, wherein the target shared network supports both Packet Switching (PS) and Circuit Switching (CS) and
wherein the registered domain is a PS domain and the non-registered domain is a CS domain, or the registered domain is a CS domain and the non-registered domain is a PS domain; and
wherein the handover of the device is a CS handover or a PS handover.

25. The RAN node according to claim 14, wherein the target shared network is a GateWay Core Network (GWCN) or a Multi Operator Core Network (MOCN).

26. The RAN node according to claim 14, wherein the RAN node is a Base Station Controller (BSC) or a Radio Network Controller (RNC) wherein the non-registered CN node is a Mobile Switching Center (MSC) or a Serving General packet radio service Support Node (SGSN), and wherein the registered CN node is a SGSN or a MSC.

27. A method, comprising:
a radio access network (RAN) node receiving a first registration message transmitted by a user equipment (UE) having an International Mobile Subscriber Identity (IMSI);
after receiving the first registration message, the RAN node transmitting to a first core network node a first message that does not include the UE's IMSI;
after transmitting the first message to the first core network node, the RAN node receiving a second message transmitted by the first core network node, said second message comprising the UE's IMSI;
after receiving the second message, the RAN node transmitting a third message to a second core network node, the third message comprising the UE's IMSI;
after transmitting the third message to the second core network node, the RAN node receiving a fourth message transmitted by the second core network node, said fourth message comprising information identifying an operator serving the UE;
after receiving the fourth message, the RAN node selecting a core network node associated with the identified operator; and
after selecting the core network node, the RAN node transmitting to the selected core network node a second registration message.

28. The method of claim 27, wherein said first registration message is one of a Routing Area Update (RAU) message and a Location Area Update (LAU) message.

29. The method of claim 27, wherein the second registration message is one of a Routing Area Update (RAU) message and a Location Area Update (LAU) message.

* * * * *

UNITED STATES PATENT AND TRADEMARK OFFICE
CERTIFICATE OF CORRECTION

PATENT NO. : 9,510,245 B2  
APPLICATION NO. : 14/439487  
DATED : November 29, 2016  
INVENTOR(S) : Karlsson et al.

It is certified that error appears in the above-identified patent and that said Letters Patent is hereby corrected as shown below:

On the Title Page

In Item (72), under "Inventors", in Column 1, Line 3, delete "Molnlycke" and insert -- Mölnlycke --, therefor.

In the Drawings

In Fig. 4, Sheet 4 of 13, for Tag "310b.", in Line 3, delete "CN node C" and insert -- CN node B --, therefor.

In Fig. 9, Sheet 9 of 13, delete Tag "310a." and insert Tag -- 310 --, therefor.

In the Specification

In Column 3, Line 42, delete "MOON" and insert -- MOCN --, therefor.

In Column 3, Line 51, delete "illustrates" and insert -- illustrate --, therefor.

In Column 4, Line 41, delete "MOON" and insert -- MOCN --, therefor.

In Column 4, Line 64, delete "MOON" and insert -- MOCN --, therefor.

In Column 7, Line 22, delete "MOON" and insert -- MOCN --, therefor.

In Column 9, Line 46, delete "MOON" and insert -- MOCN --, therefor

Signed and Sealed this  
Eleventh Day of April, 2017

Michelle K. Lee  
*Director of the United States Patent and Trademark Office*

CERTIFICATE OF CORRECTION (continued)
U.S. Pat. No. 9,510,245 B2

In Column 10, Line 14, delete "non-registered CN node 310a" and insert -- non-registered CN node 310b --, therefor.

In Column 10, Line 67, delete "MOON" and insert -- MOCN --, therefor.

In Column 11, Line 30, delete "MOON" and insert -- MOCN --, therefor.

In Column 12, Line 3, delete "MOON" and insert -- MOCN --, therefor.

In Column 12, Line 5, delete "MOON" and insert -- MOCN --, therefor.

In Column 12, Line 8, delete "MOON" and insert -- MOCN --, therefor.

In Column 12, Line 57, delete "MOON." and insert -- MOCN. --, therefor.

In Column 13, Line 60, delete "MOON." and insert -- MOCN. --, therefor.

In Column 14, Line 14, delete "MOON." and insert -- MOCN. --, therefor.

In Column 14, Line 43, delete "MOON." and insert -- MOCN. --, therefor.

In Column 14, Lines 45-46, delete "device 305," and insert -- device 301, --, therefor.

In Column 14, Line 46, delete "I MSI," and insert -- IMSI, --, therefor.

In Column 14, Line 50, delete "device 305," and insert -- device 301, --, therefor.

In Column 15, Line 33, delete "MOON." and insert -- MOCN. --, therefor.

In Column 16, Line 16, delete "MOON." and insert -- MOCN. --, therefor.

In Column 16, Line 49, delete "registered CN node 312" and insert -- non-registered CN node 312 --, therefor.

In Column 16, Lines 49-50, delete "registered CN node 312c," and insert -- non-registered CN node 312c, --, therefor.

In Column 17, Line 4, delete "MOON." and insert -- MOCN. --, therefor.

In Column 17, Line 32, delete "MOON." and insert -- MOCN. --, therefor.

In Column 17, Line 55, delete "MOON." and insert -- MOCN. --, therefor.

In Column 18, Line 4, delete "MOON." and insert -- MOCN. --, therefor.

CERTIFICATE OF CORRECTION (continued)
U.S. Pat. No. 9,510,245 B2

In Column 18, Line 18, delete "registered CN node 312" and insert -- non-registered CN node 312 --, therefor.

In Column 18, Line 41, delete "RAN node 705" and insert -- RAN node 305 --, therefor.

In Column 18, Line 53, delete "devices 305" and insert -- devices 301 --, therefor.

In Column 19, Line 19, delete "processing circuitry 1320" and insert -- processing circuitry 1310 --, therefor.